United States Patent
Iizuka et al.

(10) Patent No.: US 8,135,764 B2
(45) Date of Patent: Mar. 13, 2012

(54) CONFIGURATION MANAGEMENT SERVER, NAME RECOGNITION METHOD AND NAME RECOGNITION PROGRAM

(75) Inventors: Daisuke Iizuka, Yokohama (JP); Yoshimasa Masuoka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 12/407,988

(22) Filed: Mar. 20, 2009

(65) Prior Publication Data

US 2010/0125595 A1 May 20, 2010

(30) Foreign Application Priority Data

Nov. 14, 2008 (JP) ................................ 2008-291722

(51) Int. Cl.
*G06F 17/30* (2006.01)
*G06F 15/177* (2006.01)
(52) U.S. Cl. .................... 707/827; 707/828; 709/222
(58) Field of Classification Search .................. 707/827, 707/828; 709/222
See application file for complete search history.

(56) References Cited

U.S. PATENT DOCUMENTS

| | | | | |
|---|---|---|---|---|
| 7,051,098 B2 * | 5/2006 | Masters et al. | ................ | 709/224 |
| 7,096,248 B2 * | 8/2006 | Masters et al. | ................ | 709/201 |
| 7,506,338 B2 * | 3/2009 | Alpern et al. | ................ | 717/177 |
| 2003/0191829 A1 * | 10/2003 | Masters et al. | ................ | 709/223 |
| 2006/0047947 A1 * | 3/2006 | Langworthy et al. | ......... | 713/151 |
| 2009/0178035 A1 * | 7/2009 | Alpern et al. | ................ | 717/177 |
| 2009/0271863 A1 * | 10/2009 | Govindavajhala et al. | ..... | 726/23 |

FOREIGN PATENT DOCUMENTS

| | | |
|---|---|---|
| JP | 02-301020 A | 12/1990 |
| JP | 2006-164374 A | 6/2006 |
| JP | 2008-204518 A | 9/2008 |

OTHER PUBLICATIONS

"IBM Tivoli Application Dependency Discovery Manager", pp. 1-8, IBM Corporation 2008.
"InstList" (free soft), 2002 http://www.forest.iprocess.co.jp/lib/sys/instng/instlist.html.

* cited by examiner

*Primary Examiner* — Mohammad Ali
*Assistant Examiner* — Bao Tran
(74) *Attorney, Agent, or Firm* — Kilpatrick Townsend & Stockton LLP

(57) ABSTRACT

An absolute path name and a command line of a process associated with a process operating on a business server are found from process information acquired from the business server. A standard process decision unit judges an OS standard process. An interpreter decision unit judges an interpreter name from the command line. A shared directory decision unit judges an executive file name located directly under a shared directory. A subdirectory decision unit judges a parent-child relation of an executive file directory from the absolute path name of the executable file. As a result, an application name recognition unit recognizes a name of an application.

9 Claims, 12 Drawing Sheets

| BUSINESS SERVER NAME (211) | PROCESS ID (212) | EXECUTABLE FILE ABSOLUTE PATH NAME (213) | COMMAND LINE (214) | LISTENING PORT LIST (215) |
|---|---|---|---|---|
| host1 | 100 | c:¥perl¥perl.exe | perl-w formatlog.pl | |
| host2 | 1 | /sbin/init | init[5] | |
| host2 | 50 | /bin/sleep | mysleep | |
| host3 | 200 | c:¥myapp¥bin¥progA | progA | 80/tcp |
| host3 | 201 | c:myapp¥tools¥progB | progB | 161/udp |
| ⋮ | ⋮ | ⋮ | ⋮ | ⋮ |

| BUSINESS SERVER NAME (221) | OS NAME (222) | OS VERSION (223) |
|---|---|---|
| host1 | Windows | 5.1.2600 |
| host2 | Windows | 5.2.3790 |
| host3 | xxOS | 1.2.3 |
| host4 | xxOS | 1.2.5 |
| ⋮ | ⋮ | ⋮ |

| OS NAME | OS VERSION | EXECUTABLE FILE ABSOLUTE PATH NAME |
|---|---|---|
| Windows | 5.2.3790 | c:Windows¥System32¥services.exe |
| Windows | 5.2.3790 | c:Windows¥System32¥services.exe |
| xxOS | 2.6.18-8.el5 | /sbin/init |
| xxOS | 2.6.18-8.el5 | /sbin/login |
| ⋮ | ⋮ | ⋮ |

| INTERPRETER NAME |
|---|
| sh |
| perl |
| python |
| java |
| ⋮ |

| SHARED DIRECTORY ABSOLUTE PATH NAME |
|---|
| / |
| /usr/ |
| /home/ |
| c:¥ |
| c:¥Program Files¥ |
| ⋮ |

| EXECUTABLE DIRECTORY RELATIVE PATH NAME |
|---|
| bin/ |
| tools/ |
| libexec/ |
| binn/ |
| ⋮ |

| LISTENING PORT NUMBER (271) | PROTOCOL TO BE USED (272) | ACQUISITION METHOD (273) |
|---|---|---|
| 80/tcp | http | HTML |
| 443/tcp | https | HTML |
| 3770/tcp | iiop | JSR77 |
| 161/udp | snmp | JSR77 |
| 5988/tcp | http | JSR77 |
| 5989/tcp | https | JSR77 |
| ⋮ | ⋮ | ⋮ |

| ABSOLUTE PATH NAME | PROCESS ID LIST | AP NAME |
|---|---|---|
| c:¥formatlog.pl | 100 | formatlog.pl |
| c:¥myapp¥ | 200, 201 | myapp |
| c:¥Program File¥Apache Software Foundation¥Tomcat¥ | 300 | Apache Software Foundation Tomcat |
| ... | ... | ... |

281  282  283

CONFIGURATION MANAGEMENT SERVER, NAME RECOGNITION METHOD AND NAME RECOGNITION PROGRAM

INCORPORATION BY REFERENCE

The present application claims priority from Japanese application JP2008-291722 filed on Nov. 14, 2008, the content of which is hereby incorporated by reference into this application.

BACKGROUND OF THE INVENTION

The present invention relates to mainly a technique for recognizing a name of an application included in a business system, as a management method of the business system executed in an information processing system including a plurality of computers utilizing a network.

There is a computer system in which business servers and business clients are connected to a network and an application is operated on a business server to provide service to business clients. In this computer system, it is important in stable operation of a business system to know information as to an application having what name is operating on which business server.

According to a method considered as one of methods for knowing such an application name, a name of an application operating on a business server is recognized by having relations between application names and listening ports of the TCP (Transmission Control Protocol) and UCP (User Datagram Protocol) as information and conducting communication by using a management protocol specific to the application.

According to another considered method, a directory name itself of an executable file installed on a business server is found as a name of an installed application (InstList 2002, http://www.forest.impress.co.jp/lib/sys/instmng/softmng/instlist.html).

SUMMARY OF THE INVENTION

The above-described conventional techniques have problems described below.

The method of having relations between application names and listening ports of the TCP and UCP as information and conducting communication by using a management protocol specific to the application has a problem that a name of an application of a new kind or an application subjected to version up cannot be recognized because the listening port or the management protocol differs every application or every application version in some cases.

For solving this problem, there is the method of using the directory name of the executable file as described above. If the directory name of the executable file is used, then the name of an application name can be found no matter what application and no matter what version it is. To our regret, however, the found application name is not accurate often in the scheme using the directory name of the executable file. For example, when there is an application which divides an executable file to a plurality of directories and installs the directories, this application is recognized as a plurality of independent applications. In commercial applications in recent years, a part of a commercial application is mounted by Java (trade mark) and the remaining part is mounted as an ordinary executable file in many cases. In this case, a directory storing a Java processing system is different from a directory storing the ordinary executable file. As a result, the above-described problem occurs.

Executable files of a plurality of applications are placed (stored) in a directory (shared directory) such as /usr/bin/ and /usr/local/bin/. Although processes formed of the executable files placed in the directory are originally different applications, all of the processes are recognized as the same application name and the name becomes a name which is utterly different from the application names.

Therefore, an object of the present invention is to recognize a name of an arbitrary application which operates on a business server more accurately.

A representative example of the present invention will now be described.

First, an absolute path name and a command line of an executable file associated with a process operating on a business server are found. When the found process is a process which operates immediately after installment of an OS (Operating System) or a process which does not need to find an application name, an application name of the process is not found.

When an executable file of the process becomes a script processing system such as perl, python or sh, the application name is found from a directory name or a file of a script delivered to the command line of the process.

Subsequently, when the executable file is located directly under a shared directory such as /usr/bin/ or /usr/local/bin/, the application name is found from the file name of the executable file. Even if the executable file is located not directly under the shared directory but located further below, the application name may be found.

When any of the above-described conditions is not satisfied, an absolute path name of a directory is taken out from an absolute path name of the executable file. When its end is a typical directory name having an executable file directly under it, such as /bin/ or /tools/, the end is removed and then a recognized application name is compared with a directory name associated therewith. If one of them becomes a subdirectory of the other, an application name is found from a shorter directory name.

When any of the above-described conditions is not satisfied, the application name is found from the directory name. Details will be described later.

According to the present invention, a name of an arbitrary application which operates on a business server can be recognized more accurately.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing a structure, contents and a concrete example of a collected process list 210;

FIG. 4 is a diagram showing a structure, contents and a concrete example of a business server list 220;

FIG. 5 is a diagram showing a structure, contents and a concrete example of an OS standard process list 230;

FIG. 6 is a diagram showing a structure, contents and a concrete example of an interpreter name list 240;

FIG. 7 is a diagram showing a structure, contents and a concrete example of a shared directory absolute path name list 250;

FIG. 8 is a diagram showing a structure, contents and a concrete example of an executable directory relative path name list 260;

FIG. 9 is a diagram showing a structure, contents and a concrete example of an application name acquisition method list 270;

FIG. 10 is a diagram showing a structure, contents and a concrete example of a recognized application name list 280;

DESCRIPTION OF THE EMBODIMENTS

First Embodiment

Hereafter, a first embodiment of the present invention will be described with reference to the drawings.

Figure 1:
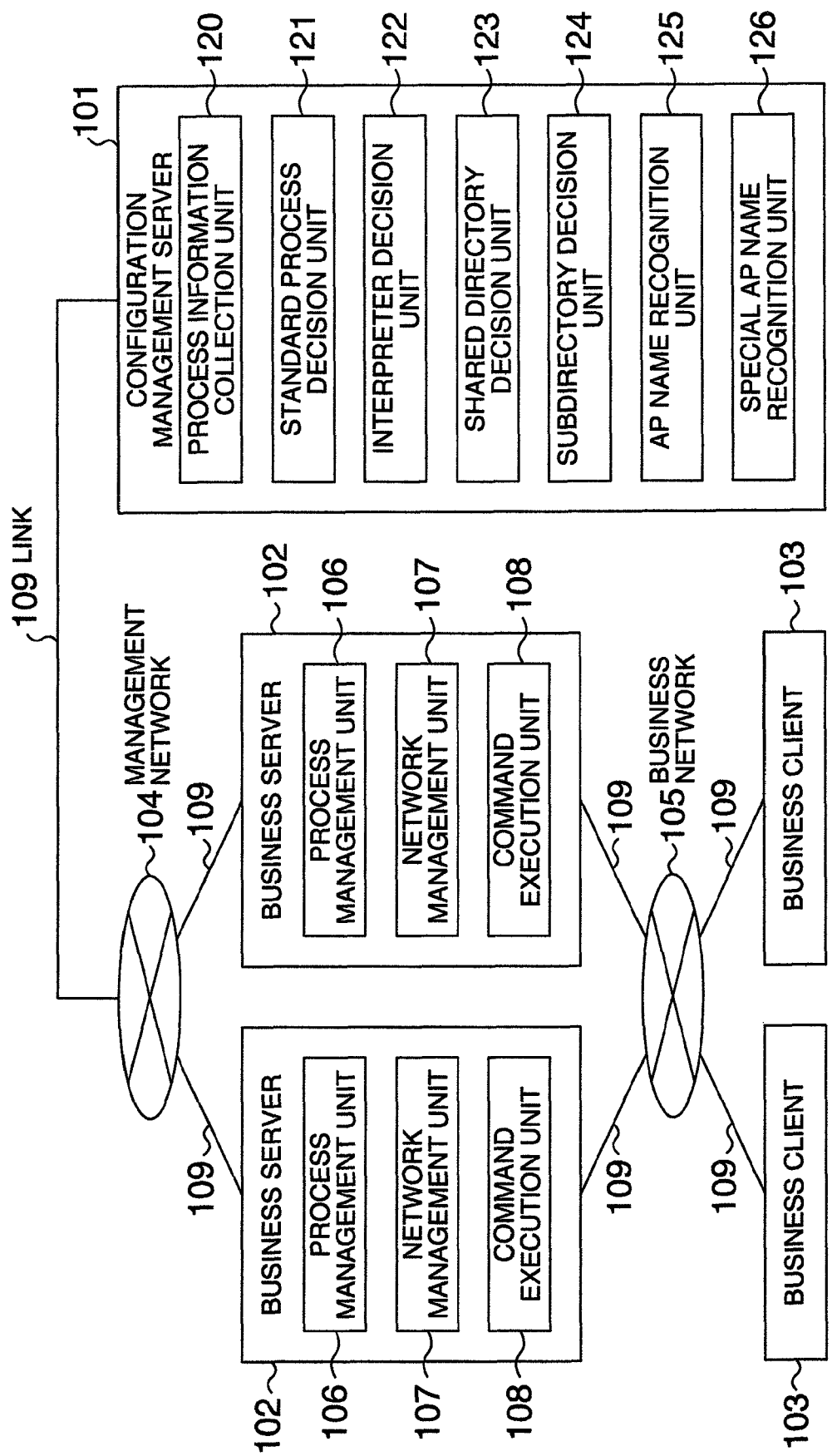
FIG. 1 is an example of a diagram showing a general configuration of an information processing system according to an embodiment of the present invention.

FIG. 1 is an example of a diagram showing a general configuration of an information processing system according to the first embodiment of the present invention. The information processing system includes a configuration management server 101, business servers 102 and business clients 103. The business server 102 provides the business clients 103 with service by causing an application program (hereafter referred to simply as "application" in some cases) to operate on the own server.

The configuration management server 101 and the business servers 102 are connected to a management network 104 via links 109. The business servers 102 and the business clients 103 are connected to a business network 105 via links 109. The link 109 uses a wire or wireless connection scheme, and the link 109 may include a subnetwork. The configuration management server 101, the business servers 102 and the business clients 103 may be connected to the management network 104 or the business network 105 by using respective different schemes. The management network 104 and the business network 105 may be the same network.

Each of the number of the business servers 102 and the number of the business clients 103 is two in the illustrated example. Alternatively, the number may be one or a plurality. As for the configuration management server 101, the business servers 102 and the business clients 103, at least two of them may be housed in the same casing or may be the same virtual machine (VM).

The business server 102 stores contents of an executable file retained in the business server 102 into a main storage of the business server 102 as a program, and generates a process by executing the program in a processor in the business server 102. The business server 102 provides the business clients 103 with service by executing an application program and generating at least one process.

The business server 102 includes a process management unit 106, a network management unit 107 and a command execution unit 108.

The process management unit 106 retains information of a process generated on the business server 102.

The network management unit 107 retains information of listening ports of the TCP or UDP used by the process.

The command execution unit 108 executes a command which is input from an external computer, such as, for example, the business client 103.

As for the process management unit 106, the network management unit 107 and the command execution unit 108, a program may be stored in the main storage in the business server 102 and executed by the processor in the business server 102. The process management unit 106, the network management unit 107 and the command execution unit 108 may be implemented by using hardware formed as an integrated circuit.

The configuration management server 101 includes a process information collection unit 120, a standard process decision unit 121, an interpreter decision unit 122, a shared directory decision unit 123, a subdirectory decision unit 124, an application name recognition unit 125 and a special application name recognition unit 126. By the way, at least one of the process information collection unit 120, the standard process decision unit 121, the interpreter decision unit 122, the shared directory decision unit 123, the subdirectory decision unit 124, the application (AP) name recognition unit 125 and the special application name recognition unit 126 may be removed. The configuration management server 101 will now be described in detail with reference to FIG. 2.

Figure 2:
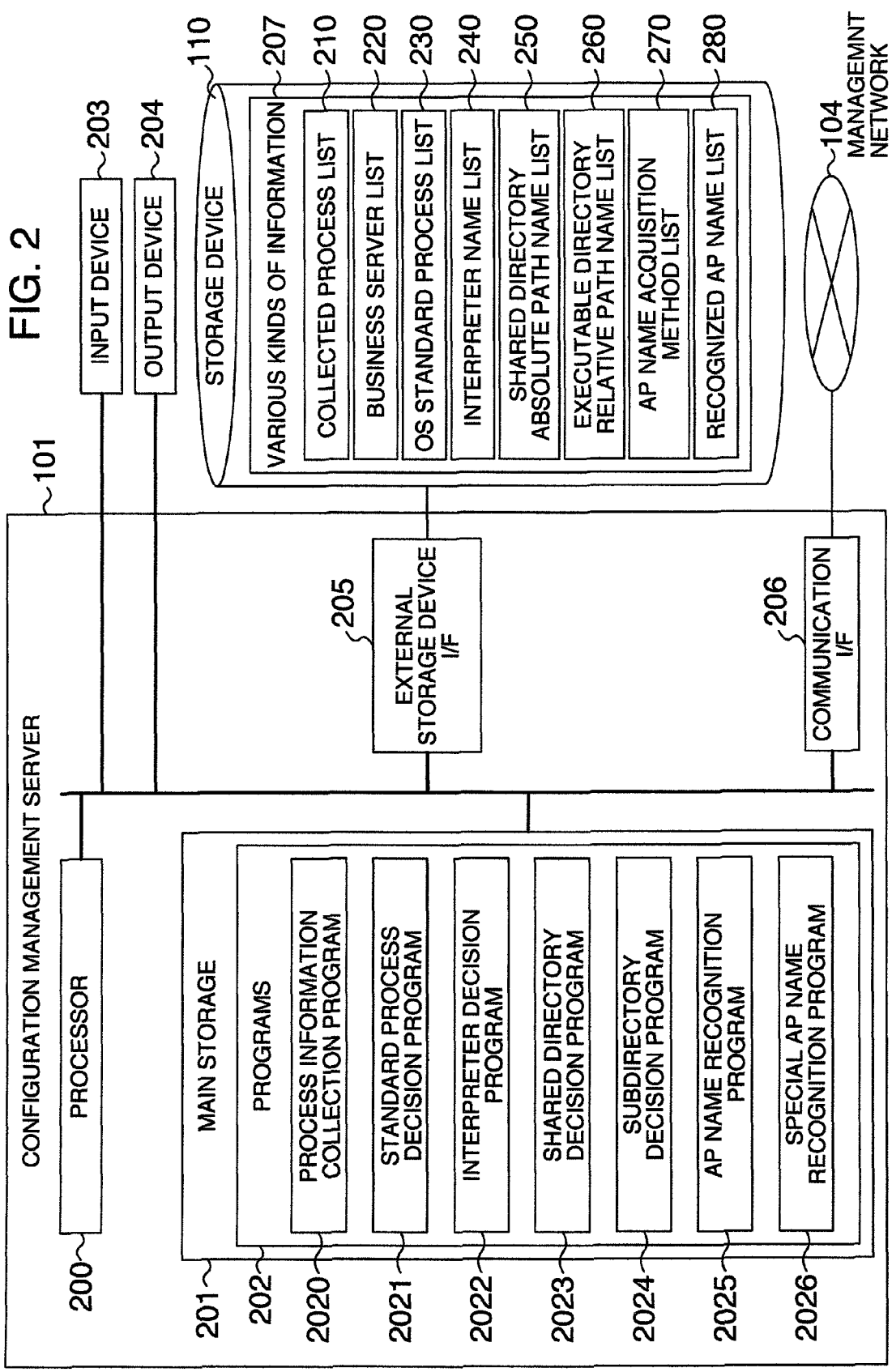
FIG. 2 is an example of a diagram showing a configuration of a configuration management server 101.

FIG. 2 is an example of a diagram showing a configuration of the configuration management server 101. The configuration management server 101 includes a processor 200 (control unit), a main storage 201 (storage unit), an input device 203, an output device 204, an external storage device interface (I/F) 205, a communication interface 206 and a storage device 110 (storage unit), and they are connected so as to make them communicate with each other.

The processor 200 executes various programs 202 such as a process information collection program 2020, a standard process decision program 2021, an interpreter decision program 2022, a shared directory decision program 2023, a subdirectory decision program 2024, an application name recognition program 2025, and a special application name recognition program 2026. As a result, processing in various units such as the process information collection unit 120, the standard process decision unit 121, the interpreter decision unit 122, the shared directory decision unit 123, the subdirectory decision unit 124, the application name recognition unit 125 and the special application name recognition unit 126 is conducted.

By the way, at least one of the various programs 202 such as a process information collection program 2020, a standard process decision program 2021, an interpreter decision program 2022, a shared directory decision program 2023, a subdirectory decision program 2024, an application name recognition program 2025, and a special application name recognition program 2026 may be removed.

Instead of execution of various programs conducted by the processor 200, the process information collection unit 120, the standard process decision unit 121, the interpreter decision unit 122, the shared directory decision unit 123, the subdirectory decision unit 124, the application name recognition unit 125 and the special application name recognition unit 126 may be implemented as processing units which conduct respective kinds of processing by using hardware formed as an integrated circuit. In the ensuing description, it is supposed to simplify the description that respective processing units implemented by execution of various programs 202 stored on the main storage 201 conducted by the processor 200 are subjects of respective kinds of processing.

The external storage device interface 205 is connected to the storage device 110. The storage device 110 may be provided outside the configuration management server 101 or may be provided inside the configuration management server 101. The storage device 110 retains various kinds of information 207 including a collected process list 210 (process information), a business server list 220 (business server information), an OS standard process list 230 (operating system standard process information), an interpreter name list 240 (interpreter name information), a shared directory absolute path name list 250 (shared directory absolute path name information), an executable directory relative path name list 260 (executable directory relative path name information), an application name acquisition method list 270, and a recognized application name list 280 (recognized application program name information).

At least one of the collected process list 210, the business server list 220, the OS standard process list 230, the interpreter name list 240, the shared directory absolute path name list 250, the executable directory relative path name list 260, the application name acquisition method list 270, and the recognized application name list 280 may be removed. At least one kind of information among the various kinds of information 207 retained by the storage device 110 may be stored in the main storage 201. The various kinds of information 207 will be described in detail later with reference to FIGS. 3 to 9.

The communication interface 206 is connected to the management network 104. The communication interface 206 and the external storage device interface 205 may be the same interface.

—Data Structure—

FIG. 3 is a diagram showing a structure, contents and a concrete example of the collected process list 210. The collected process list 210 takes a table form, and has at least one row. Every row includes five columns. The five columns are a business server name 211, a process ID (Identification) 212, an executable file absolute path name 213, a command line 214 and a listening port list 215. Although not illustrated, each row in the collected process list 210 may include other columns.

In the collected process list 210, information of one row is stored for each of processes operating on each of the business servers 102 which are present in the information processing system. In other words, a host name of the business server 102 is stored in the business server name 211, a process ID for identifying the process is stored in the process ID 212, an absolute path name of an executable file of the process is stored in the executable file absolute path name 213, a command line (including a process name) is stored in the command line 214, and a port of the TCP or UDP the process is listening to is stored in the listening port list 215.

The information to be stored in the business server name 211 can be acquired by using a method which is the same as that used to find the host name of the business server 102 described with reference to FIG. 3. In other words, the information to be stored in the business server name 211 can be acquired from an execution result obtained when a hostname command is executed on the business server 102 or information of an instance of a Win32_ComputerSystem class in WMI.

The process ID 212, the executable file absolute path name 213 of the process, and the command line 214 of the process can be acquired from the process management unit 106 in the business server 102. Information of these kinds can be acquired from the process management unit 106 by referring to, for example, to an execution result obtained when a ps command or an lsof command is executed on the business server 102, contents of files which are present in a /proc/ file system or below, or a property of an instance of a Win32_Process class in WMI (Windows (trade mark)) Management Infrastructure). Information of the process ID 212, the executable file absolute path name 213 of the process, and the command line 214 of the process may be acquired by using a method other than the above-described methods.

Information to be stored in the listening port list 215 is acquired from the network management unit 107 in the business server 102. These kinds of information can be acquired from the network management unit 107 by referring to, for example, an execution result obtained when a netstat command or the lsof command is executed on the business server 102. Information to be stored in the listening port list 215 may be acquired by using a method other than the above-described methods.

Information stored in the collected process list 210 is utilized in all of the various programs 202. The information in the collected process list 210 may be generated by manual work of a system manager of the information processing system, or by using some tool or utility.

Unless processing of finding an application name by using the application acquisition method list 270 as described later is conducted by the special application name recognition unit 126, the collected process list 210 may not include the listening port 215. Unless processing of finding a directory name or a script name from the command line 214 by using the interpreter name list 240 is conducted by the interpreter decision unit 122, the collected process list 210 may not include the command line 214.

FIG. 4 is a diagram showing a structure, contents and a concrete example of the business server list 220. The business server list 220 takes a table form, and has at least one row. Every row includes three columns. The three columns are a business server name 221, an OS name 222, and an OS version 223. Although not illustrated, each row in the business server list 220 may include other columns.

In the business server list 220, information of one row is stored for each of the business servers 102 which are present in the information processing system. In other words, a host name of the business server 102 is stored in the business server name 221, and a name and a version of an OS (for example, Windows) operating on the business server 102 are stored in the OS name 222 and the OS version 223, respectively.

Among them, the business server name 221 can be acquired from an execution result obtained when the hostname command is executed on the business server 102 or information of an instance of a Win32_ComputerSystem class in WMI.

The OS name 222 and the OS version 223 can be acquired from, for example, an execution result obtained when a uname command is executed on the business server 102 or information of an instance of a Win32_OperationSystem class in WMI.

Information stored in the business server list 220 is utilized in the standard process decision unit 121. The information to be stored in the business server list 220 may be generated by manual work of the system manager of the information processing system, or by using some tool or utility.

FIG. 5 is a diagram showing a structure, contents and a concrete example of the OS standard process list 230. The OS standard process list 230 takes a table form, and has at least one row. Every row includes three columns. The three columns are an OS name 231, an OS version 232, and an executable file absolute path name 233. Although not illustrated, each row in the OS standard process list 230 may include other columns.

In the OS standard process list 230, information concerning an absolute path name of an executable file of a process operating immediately after installment of an OS or an absolute path name of an executable file of a process for which an application name need not be recognized, an OS name, and an OS version are stored in the executable file absolute path name 233, the OS name 231 and the OS version 232, respectively. An absolute path name of an executable file of a process operating immediately after installment of an OS can be acquired from, for example, an execution result obtained by installing an OS in an arbitrary computer and executing the ps command or the lsof command on the computer immediately after the installment is completed, or information of an instance of a Win32_OperationSystem class in WMI.

Information stored in the OS standard process list 230 is utilized in the standard process decision unit 121. The information to be stored in the OS standard process list 230 may be generated by manual work of the system manager of the information processing system, or by using some tool or utility.

FIG. 6 is a diagram showing a structure, contents and a concrete example of the interpreter name list 240. The interpreter name list 240 takes a table form, and has at least one row. Every row includes one column. The one column is an interpreter name 241. Although not illustrated, each row in the interpreter name list 240 may include other columns.

In the interpreter name list 240, a process name of an interpreter processing system which processes a script language such as perl, python and sh, or a process name of an interpreter (language) processing which processes an intermediate language such as java are stored in the interpreter name 241.

Information stored in the interpreter name list is utilized in the interpreter decision unit 122. Information to be stored in the interpreter name list 240 may be generated by manual work of the system manager of the information processing system, or by using some tool or utility.

FIG. 7 is a diagram showing a structure, contents and a concrete example of the shared directory absolute path name list 250. The shared directory absolute path name list 250 takes a table form, and has at least one row. Every row includes one column. The one column is a shared directory absolute path name 251. Although not illustrated, each row in the shared directory absolute path name list 250 may include other columns.

In the shared directory absolute path name list 250, a directory name (absolute path name) of a directory under which executable files of a plurality of applications are stored, such as /usr/bin/, /usr/local/bin/, /opt/, c:¥, or c:¥Program Files¥, is stored in the shared directory absolute path name 251.

Information stored in the shared directory absolute path name list 250 is utilized in the shared directory decision unit 123. The information to be stored in the shared directory absolute path name list 250 may be generated by manual work of the system manager of the information processing system, or by using some tool or utility.

FIG. 8 is a diagram showing a structure, contents and a concrete example of the executable directory relative path name list 260. The executable directory relative path name list 260 takes a table form, and has at least one row. Every row includes one column. The one column is an executable directory relative path name 261. Although not illustrated, each row in the executable directory relative path name list 260 may include other columns.

In the executable directory relative path name list 260, a subdirectory name having a high possibility that an executable file will be placed immediately under or further below, such as /bin/ or /tools/, is stored in the executable directory relative path name 261.

Information stored in the executable directory relative path name list 260 is utilized in the subdirectory decision unit 124 and the application name recognition unit 125. The information to be stored in the executable directory relative path name list 260 may be generated by manual work of the system manager of the information processing system, or by using some tool or utility.

FIG. 9 is a diagram showing a structure, contents and a concrete example of the application name acquisition method list 270. The application name acquisition method list 270 takes a table form, and has at least one row. Every row includes three columns. The three columns are a listening port number 271, a protocol to be used 272, and an acquisition method 273. Although not illustrated, each row in the application name acquisition method list 270 may include other columns.

In the application name acquisition method list 270, information as to which protocol should be used and what information should be acquired from an application to recognize a name of the application is stored as a method other than the method of finding the application name from a directory name. Specifically, a listening port number for the application is stored in the listening port number 271. A protocol to be used is stored in the protocol to be used 272. A data acquisition method depending upon the protocol to be used (for example, if the protocol to be used is http, data to be acquired is an HTTP document. Details will be described later.) is stored in the acquisition method 273.

Information stored in the application name acquisition method list 270 is utilized in the special application name recognition unit 126. The information to be stored in the application name acquisition method list 270 may be generated by manual work of the system manager of the information processing system, or by using some tool or utility.

FIG. 10 is a diagram showing a structure, contents and a concrete example of the recognized application name list 280. The recognized application name list 280 takes a table form, and has at least one row. Every row includes three columns. The three columns are an absolute path name 281, a process ID list 282, and an application name 283. Although not illustrated, each row in the recognized application name list 280 may include other columns.

In the recognized application name list 280, a name of an application recognized in the present embodiment and information relating thereto are stored. Specifically, an absolute path name of a directory which becomes an installment destination of the recognized application is stored in the absolute path name 281, a process ID of the process is stored in the process ID list 282, and a name of the recognized application is stored in the application name 283.

Information stored in the recognized application name list 280 is utilized in the interpreter decision unit 122, the shared directory decision unit 123, the subdirectory decision unit 124, and the application name recognition unit 125. The information to be stored in the recognized application name list 280 may be generated by manual work of the system manager of the information processing system, or may be generated by using some tool or utility with a part or the whole of work automated.

—Outline of Processing—

Figure 11:
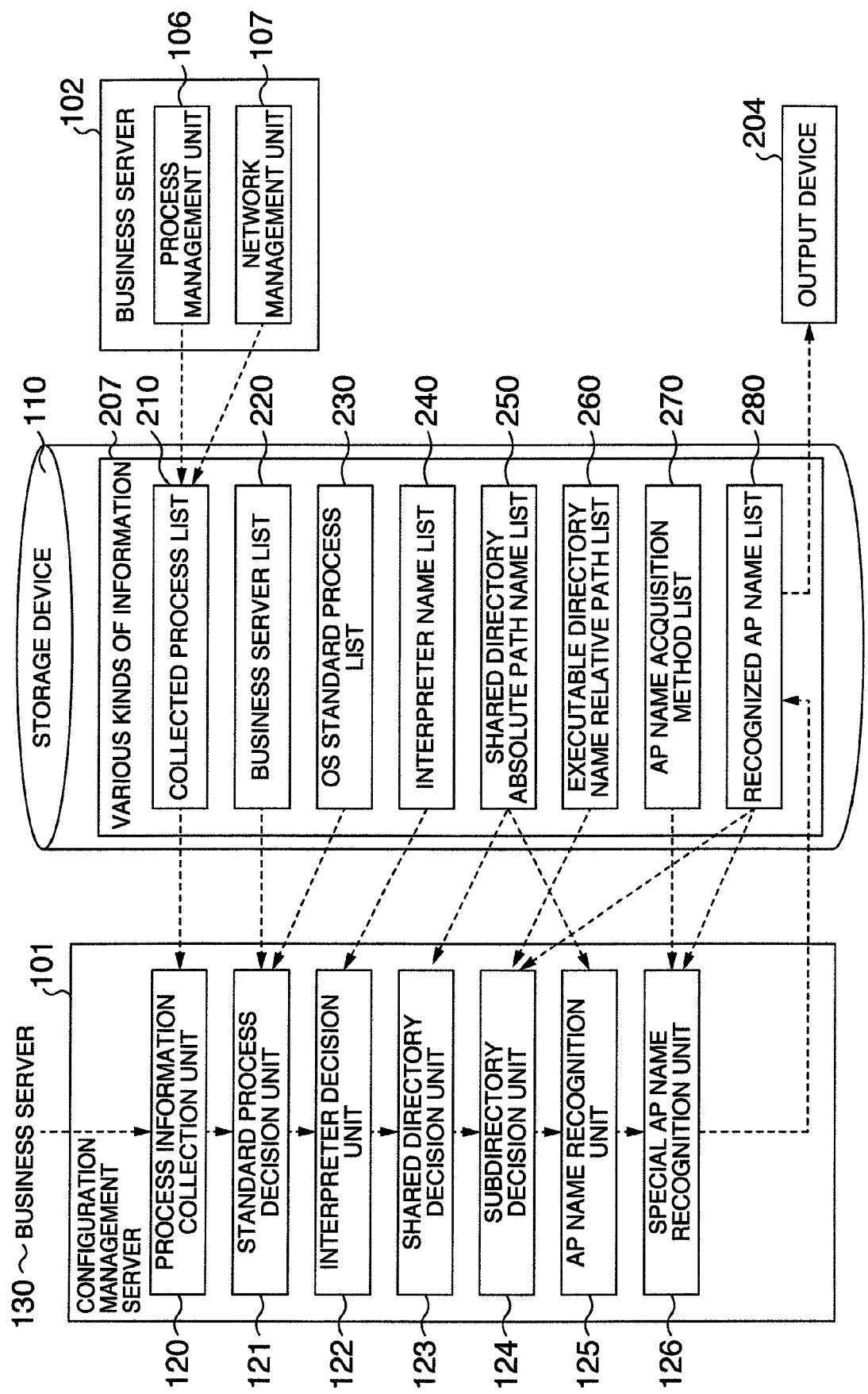
FIG. 11 is a diagram showing data flows between respective processing units and various kinds of information 207 in the first embodiment of the present invention.

FIG. 11 is a diagram showing rough processing flows in respective processing units such as the standard process decision unit 121, the interpreter decision unit 122, the shared directory decision unit 123, the subdirectory decision unit 124, the application name recognition unit 125 and the special application name recognition unit 126 included in the configuration management server 101 according to the first embodiment of the present invention, and data flows between the various kinds of information 207 such as the collected process list 210, the business server list 220, the OS standard process list 230, the interpreter name list 240, the shared directory absolute path name list 250, the executable directory name relative path list 260, the application name acquisition method list 270 and the recognized application name list 280 stored in the storage device 110 and respective processing units. Details of processing in respective processing units will now be described with reference to FIGS. 12 to 14. In FIG. 11, solid line arrows indicate rough processing flows, and dashed line arrows indicate data flows.

First, a business server name 130 is input to the process information collection unit 120. The business server name 130 is input from the input device 203 in the configuration management server 101 by, for example, a user who desires to recognize a name of an application operating on the business server 102. The process information collection unit 120 acquires a list of processes operating on the business server 102 associated with the business server name 130 from the collected process list 210. By the way, information in the collected process list 210 is acquired from the process management unit 106 and the network management unit 107 included in the business server 102. The information may be acquired by using a method other than this method and stored in the collected process list 210. The process information collection unit 120 may acquire the information directly from the process management unit 106 and the network management unit 107.

Subsequently, the standard process decision unit 121, the interpreter decision unit 122, the shared directory decision unit 123, and the subdirectory decision unit 124 conduct processing on respective processes acquired and input. And the application name recognition unit 125 and the special application name recognition unit 126 recognize an application name.

By the way, at least one processing unit among the standard process decision unit 121, the interpreter decision unit 122, the shared directory decision unit 123, the subdirectory decision unit 124, the application name recognition unit 125 and the special application name recognition unit 126 may be removed.

The standard process decision unit 121 makes a decision whether it is necessary to recognize an application name with respect to a process found by the process information collection unit 120. This is conducted by acquiring an OS name and an OS version of the business server 102 from the business server list 220 and checking the OS standard process list 230 to make a decision whether the process which is input is an OS standard process for the proper OS name and the proper OS version. By the way, the standard process decision unit 121 may acquire the OS name and the OS version of the business server directly from the business server 102.

As a result of the processing in the standard process decision unit 121, applications serving as OSs for which it is not necessary to recognize the name and their versions are excluded. Accordingly, it is prevented that a very large number of application names are found, and it becomes possible to narrow down to applications having direct relations to the business system and find application names.

The interpreter decision unit 122 makes a decision whether a process found by the process information collection unit 120 is a process of an interpreter processing system (interpreter process) such as Java, perl, or sh by referring to the interpreter name list 240. These interpreters are used from different applications in some cases. If in that case an application name is found from a directory name with respect to an interpreter process, it follows that different applications become the same in application name. When the process is judged to be an interpreter process, therefore, the application name is recognized not from a directory name of an executable file of the process but from a command line.

Owing to the processing in the interpreter decision unit 122, it becomes possible to recognize an application name more accurately with respect to an interpreter process.

The shared directory decision unit 123 makes a decision whether an executable file of a process found by the process information collection unit 120 exists directly under the shared directory, by referring to the shared directory absolute path name list 250. The shared directory is a directory, such as /usr/bin/ or /usr/local/bin/, directly under which a large number of applications (to be more precise, executable files for implementing these applications or executable files for implementing the process) are placed. If application names are found from directory names of executable files of a process with respect to a process formed of executable files placed directly under the directory, it follows that different applications become the same in application name. When the process is judged to be formed of an executable file located directly under the shared directory, therefore, the application name is found from the executable file name.

Owing to the processing in the shared directory decision unit 123, it becomes possible to recognize an application name more accurately with respect to a process formed of executable files placed directly under the shared directory.

The subdirectory decision unit 124 makes a decision whether the process is a process in which executable files of the process have different directory names but can be regarded as the same application, by referring to the executable directory relative path name list 260. For example, it is supposed that there is an application installed in "c:¥myapp¥", a directory of a process A is "c:¥myapp¥bin¥", and a directory of a process B is "c:¥myapp¥tools¥". If an application name is found from the directory names of the executable files with respect to these processes, then respective different application names are obtained although the processes should originally belong to the same application. Therefore, relative path names of directories in which executable files are frequently placed are retained as the executable directory relative path name list 260. If an end of a directory name of an executable file of a process agrees with a relative path name, the end is removed. And processing of comparing excluded directory names with each other with respect to a plurality of processes and regarding processes which coincide with each other in directory name or in which one becomes a subdirectory of the other as the same application is conducted.

Owing to the processing in the subdirectory decision unit 124, it becomes possible to recognize an application name more accurately with respect to an application which installs executable files in a plurality of directories deeper than an installment destination directory.

The application name recognition unit 125 finds an application name from only information of a process. When the interpreter decision unit 122 judges the process to be an interpreter, the application name recognition unit 125 finds an application name from a command line. When the shared directory decision unit 123 judges an executable file of a process to be directly under the shared directory, the application name recognition unit 125 finds an application name from the executable file name. Otherwise, the application name recognition unit 125 finds an application name from a directory name of the executable file of the process.

When finding an application name from a directory name, the application name recognition unit 125 checks whether an end of the directory name agrees with the executable directory relative path name list 260. At the time of agreement, the end is removed and an application name is found from the directory name. In other words, when the subdirectory decision unit 124 has judged that in the same application having different directory names of executable files of processes there is a parent-child relation between the directories, the application name recognition unit 125 finds an application name from a parent directory name.

Owing to the processing in the application name recognition unit 125, it becomes possible to recognize an application name with respect to an arbitrary application operating on the business server 102.

The special application name recognition unit 126 finds an application name by using not process information but a protocol, such as HTML or JSR77, which can be used in common to applications of a plurality of kinds. When a listening port of a process agrees with a listening port indicated in a certain row in the application name acquisition method list 270, i.e., a value registered in the listening port number 271, the special application name recognition unit 126 finds an application name by using a protocol indicated in that row, i.e., a value registered in the protocol to be used 272.

Owing to the processing in the special application name recognition unit 126, it is possible to recognize an application name more accurately than that found by the application name recognition unit 125 with respect to some applications.

If the processing heretofore described is conducted, then a list of application names operating on a business server 102 associated with a business server name 130 which is input is stored in the recognized application name list 280. Its contents can be output via the output device 204 such as a display or a printer.

—Details of Processing—

Details of processing of the application name recognition method in the first embodiment of the present invention will now be described with reference to FIG. 12, FIG. 13 (which is a general term of FIG. 13A and FIG. 13B), and FIG. 14.

Figure 12:
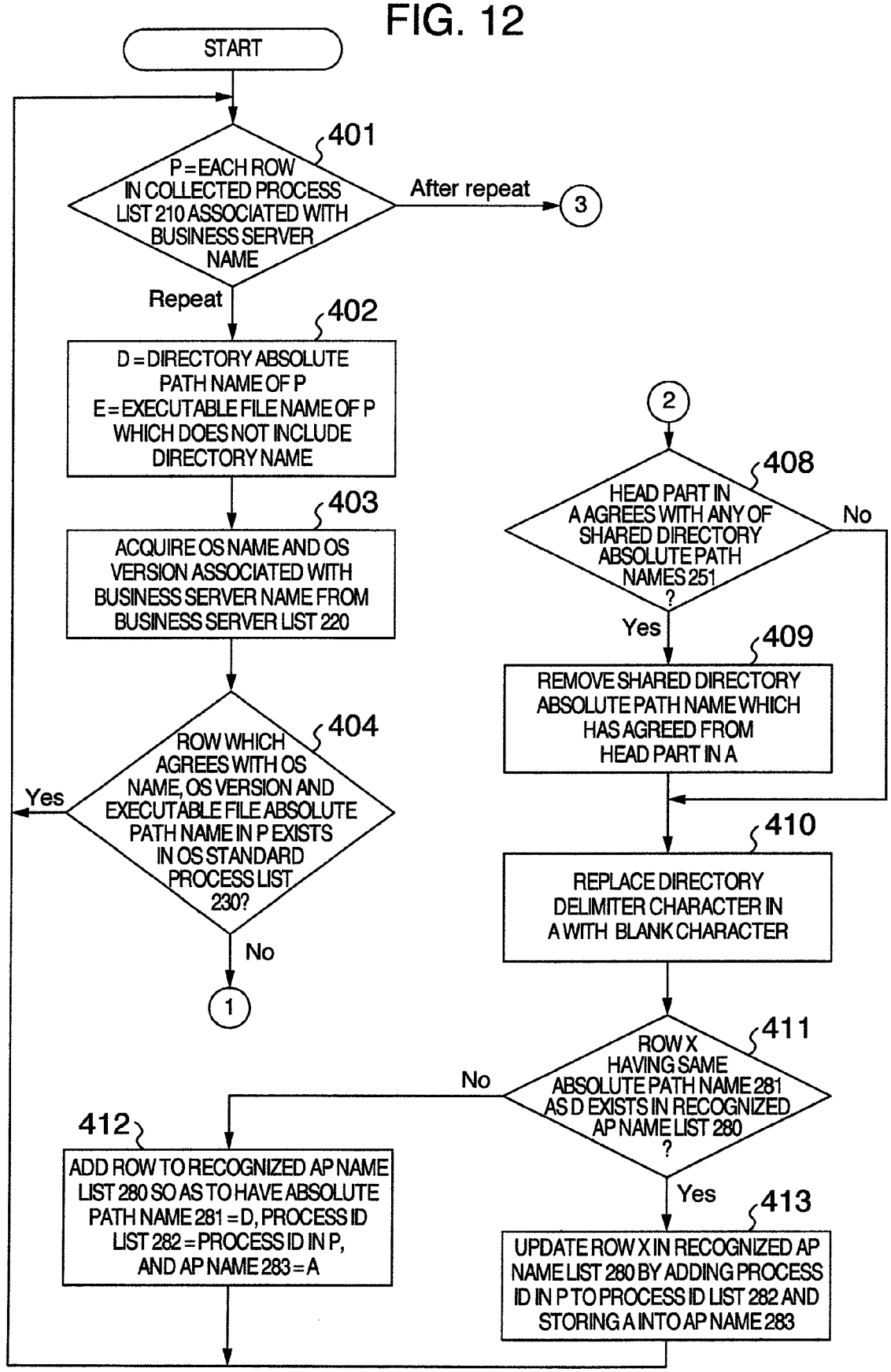
FIG. 12 is a flow diagram showing an application name recognition method in the first embodiment of the present invention, continued on FIGS. 13 and 14.
Figure 13A:
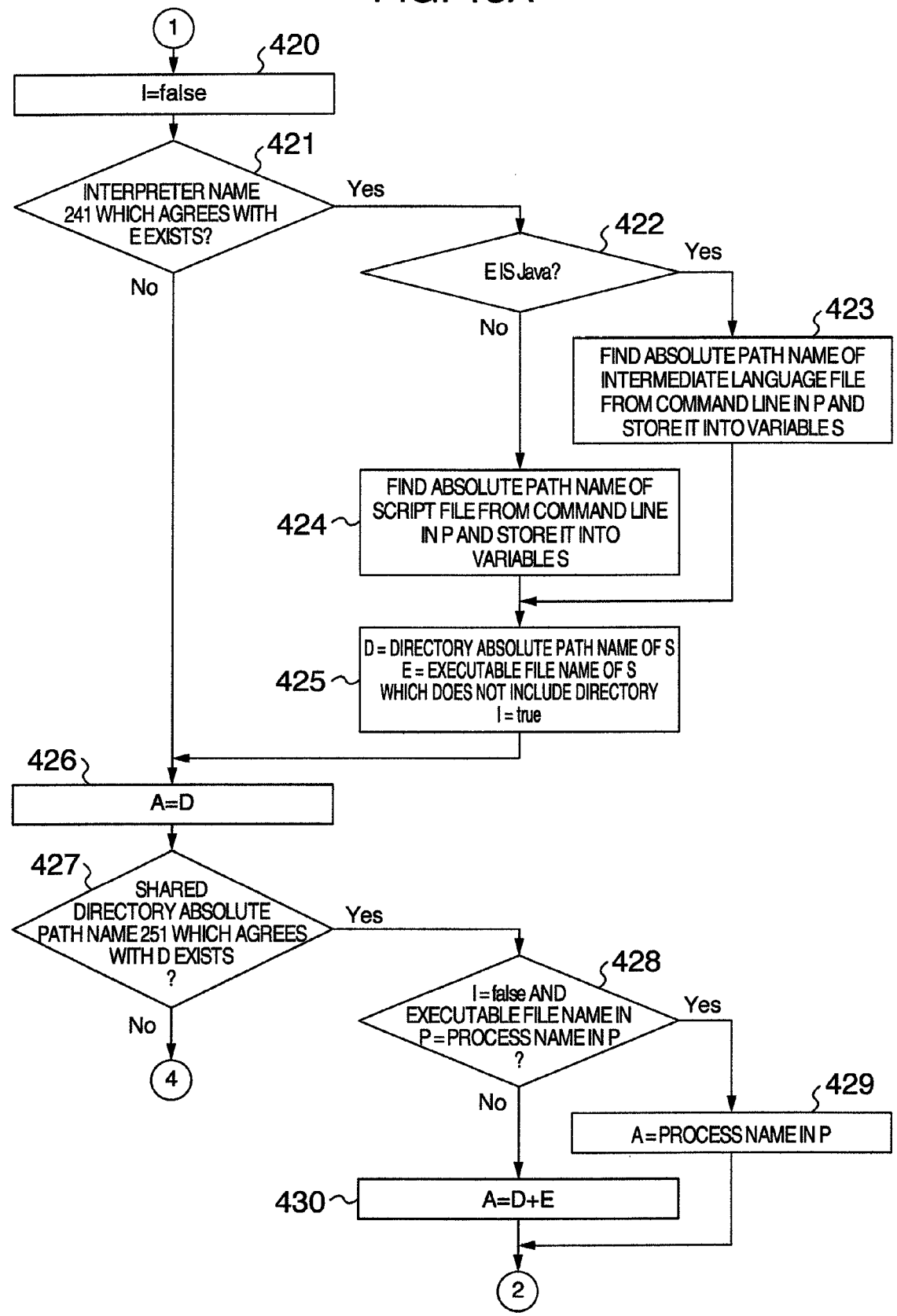
FIG. 13A is a flow diagram showing an application name recognition method, continued from FIG. 12.
Figure 13B:
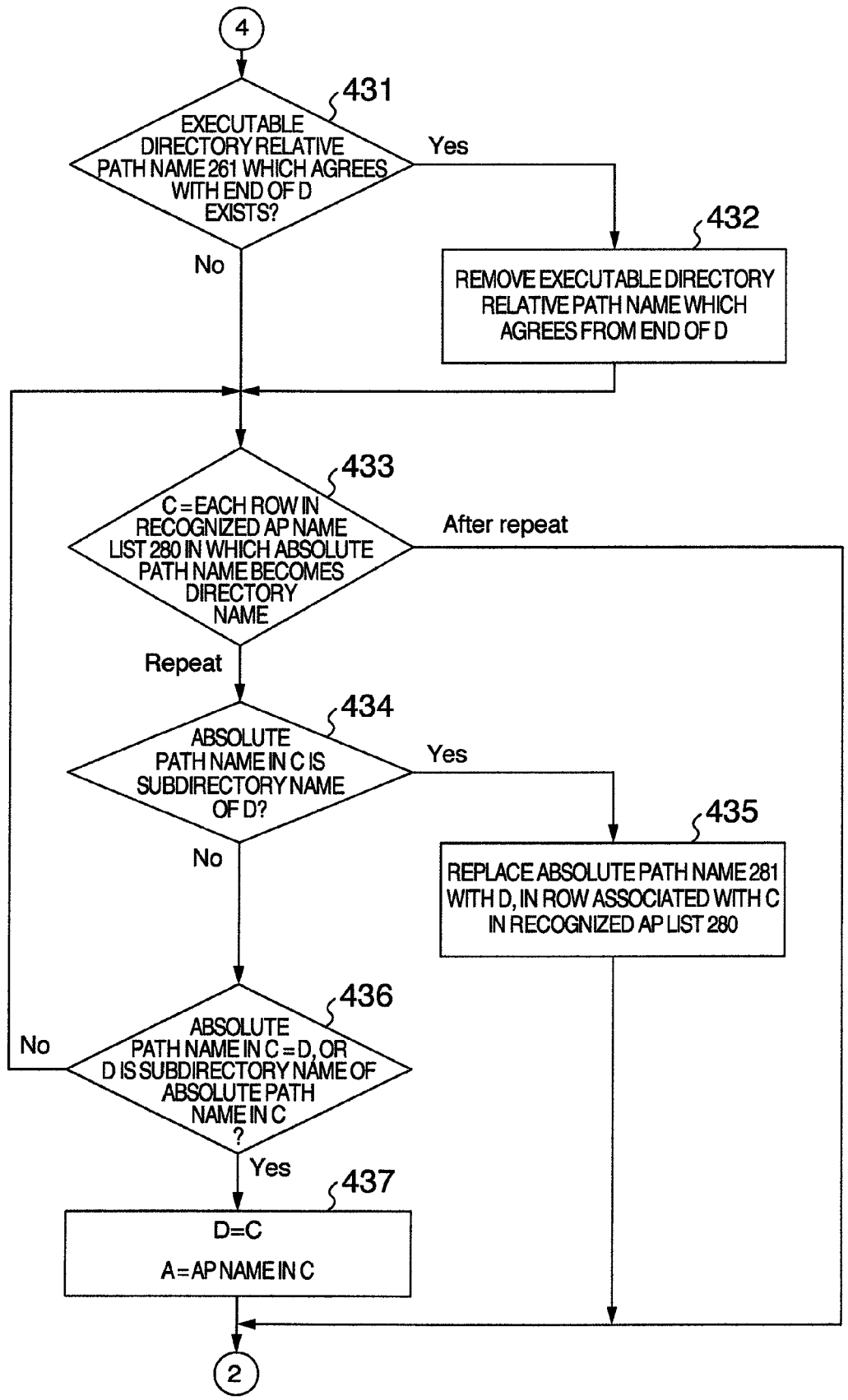
FIG. 13B is a flow diagram showing an application name recognition method, continued from FIG. 12.

FIG. 12 is a flow diagram showing processing (step 401 and step 402) conducted in the process information collection unit 120, processing (step 403 and step 404) conducted in the standard process decision unit 121, and processing (steps 408 to 413) conducted in the application name recognition unit 125. Upon receiving a business server name as an argument, the processing shown in FIG. 12 is started.

First, the process information collection unit 120 acquires each row in the collected process list 210 by using the received business server name as a key (step 401). If there is a row to be acquired ("repeat" at the step 401), then the process information collection unit 120 stores it into a variable P and proceeds to step 402. If there is no row to be acquired and processing on respective rows is finished ("after repeat" at the step 401), then the process information collection unit 120 proceeds to step 441 in FIG. 14. By the way, the process information collection unit 120 may acquire process information directly from the process management unit 106 and the network management unit 107 in the actual business server 101 and store the process information into the variable P. The process information collection unit 120 may finish the processing here instead of proceeding to the step 441 in FIG. 14.

Subsequently, the process information collection unit 120 takes out a part of a directory name and an executable file name of the variable P which does not include a directory name from the executable file absolute path name (210; see FIG. 3) in the variable P, stores the part of the directory name into a variable D as a directory absolute path name of the variable P, and stores the executable file name of the variable P into a variable E (step 402). Upon storing into the variables D and E, the process information collection unit 120 proceeds to step 403.

Subsequently, the standard process decision unit 121 searches for a row in the business server list 220 which agrees with the received business server name. And the standard process decision unit 121 acquires an OS name (222; see FIG. 4) and an OS version (223; see FIG. 4) (step 403). By the way, the standard process decision unit 121 may acquire the OS name and the OS version of the business server directly from the business server 102. After the acquisition, the standard process decision unit 121 proceeds to step 404.

Subsequently, the standard process decision unit 121 checks whether a row which agrees with the OS name and the OS version acquired at the step 403 and the executable file absolute path name stored in the variable P exists in the OS standard process list 230. In other words, the standard process decision unit 121 makes a decision whether the row coincides with values in the OS name 231, the OS version 232 and the executable file absolute path name 233 (step 404). If such a row exists (Yes at the step 404), the standard process decision unit 121 returns to the step 401. If such a row does not exist (No at the step 404), the standard process decision unit 121 proceeds to step 420.

By the way, it is also possible to omit the processing in the standard process decision unit 121 (steps 403 and 404) and execute the step 420 shown in FIG. 23 subsequently to the step 402.

After processing conducted in the interpreter decision unit 122, the shared directory decision unit 123, or the subdirectory decision unit 124 (details will be described later), the application name recognition unit 125 checks whether a head part of a character string value in the variable A (see step 426 described later) agrees with any of the shared directory absolute path names 251 in the shared directory absolute path name list 250 (step 408). In the case of agreement (Yes at the step 408), the application name recognition unit 125 removes the shared directory absolute path name 251 which has agreed, from the head part of the character string value in the variable A (step 409). Thereafter, the application name recognition unit 125 replaces a directory delimiter character (/ or ¥) in the character string value in the variable A with a blank character (step 410). On the other hand, unless agreement is obtained, (No at the step 408), the application name recognition unit 125 skips the step 409 and proceeds to the step 410.

Subsequently, the application name recognition unit 125 checks whether a row having the same absolute path name 281 as the value in the variable D (referred to as "row X") exists in the recognized application name list 280 (step 411). If such a row does not exist (No at the step 411), then a row is added to the recognized application name list 280 so as to have the value in the variable D as the absolute path name 281, have a process ID in the variable P as the process ID list 282, and the value in the variable A as the application name 283 (step 412). If such a row exists (Yes at the step 411), then the application name recognition unit 125 updates the row X in the recognized application name list 280 by adding the process ID in the variable P to the process ID list 282 and storing the value in the variable A into the application name 283 (step 413). After the step 412 and after the step 413, the application name recognition unit 125 returns to the step 401.

FIG. 13 is a flow diagram showing processing conducted in the interpreter decision unit 122 (steps 420 to 426), processing conducted in the shared directory decision unit 123 (steps 427 to 430), and processing conducted in the subdirectory decision unit 124 (steps 431 to 437) in the first embodiment of the present invention.

First, the interpreter decision unit 122 substitutes "false" for a variable I (step 420), and then checks whether an interpreter name 241 which agrees with the value in the variable E exists in the interpreter name list 240 (step 421). If such an interpreter name is not present (No at the step 421), then the interpreter decision unit 122 proceeds to step 426. If such an interpreter name is present (Yes at the step 421), the interpreter decision unit 122 proceeds to step 422.

Subsequently, the interpreter decision unit 122 checks whether the executable file name indicated by the variable E is Java (step 422). If the executable file name is judged to be Java (Yes at the step 422), then the interpreter decision unit 122 finds an absolute path name of an intermediate language file from a command line in the variable P and stores the absolute path name of the intermediate language file thus found into a variable S (step 423). Upon storing, the interpreter decision unit 122 proceeds to step 425. On the other hand, if the executable file name is judged not to be Java (No at the step 422), then the interpreter decision unit 122 finds an absolute path name of a script file from the command line in the variable P and stores the absolute path name of the script file thus found into the variable S (step 424). Upon storing, the interpreter decision unit 122 proceeds to step 425.

Subsequently, the interpreter decision unit 122 takes out a part of a directory name and an executable file name of the variable S which does not include a directory name from the absolute path name in the variable S, stores the part of the directory name into the variable D as a directory absolute path name of the variable S, stores the executable file name of the variable S into the variable E, and substitutes "true" for the variable I (step 425). Upon thus storing and substituting, the interpreter decision unit 122 substitutes the value of the variable D for the variable A (step 426). After the substitution, the interpreter decision unit 122 proceeds to step 427. By the way, a part (the steps 421 to 425) of the processing conducted in the interpreter decision unit 122 may be omitted, and the interpreter decision unit 122 may proceed from the step 420 to the step 426. Furthermore, with respect to a processing system using an intermediate language besides Java, processing corresponding to the steps 422 to 423 may be added between the step 422 and the step 424.

An example of a method for finding the absolute path name of the intermediate language file of java at the step 423 will now be described. In the case of Java, there is a command line option to be delivered to the processing system itself in a beginning part of a command line and a class name or a jar file name follows the command line.

When there is a class name subsequently to the command line option, a class path specified by a command line option -cp or -classpath or an environmental variable CLASSPATH is found. When there is "." in the class path, a current working directory of a process is acquired to replace ".". And the interpreter decision unit 122 checks where in the directory indicated by the class path or the jar file indicated by the class path on a file system of the business server 102 associated with the business server name received when the processing shown in FIG. 12 is started, a class file associated with the class name concerned exists. If the class file to be found exists on the directory, then the interpreter decision unit 122 finds an absolute path name of the class file and defines it as an absolute path name of the intermediate language file. If the class file to be found exists in the jar file, then the interpreter decision unit 122 finds an absolute path name of the jar file and defines it as an absolute path name of the intermediate language file.

If there is a jar file name subsequently to the command line option, then the interpreter decision unit 122 finds an absolute path name of the jar file and defines it as an absolute path name of the script. If the jar file name is a relative path, then the interpreter decision unit 122 finds a current working directory which is set in a process, finds an absolute path by regarding the absolute path as a relative path from the current working directory, and regards the absolute path as a file name of the script. The current working directory and the environmental variable which are set in the process can be acquired by inquiring of the process management unit 196 in the business server 102.

An example of a method for finding the absolute path name of the script file at the step 424 will now be described. The method for finding the absolute path name of the script file from the command line differs depending upon the interpreter processing system. As for an interpreter processing system which processes a script language such as perl, python and sh, typically there are at least zero command line options beginning with "-" to be delivered to the processing system itself in the beginning part of the command line and a script file name to be executed follows it. Therefore, the script file name to be executed is acquired. If the script file name is a relative path, then a current working directory of the process is found, and an absolute path of the script file is found by regarding the absolute path as a relative path from the current working directory. The current working directory which is set in the process can be acquired by inquiring of the process management unit 196 in the business server 102.

Subsequently, the shared directory decision unit 123 checks whether a shared directory absolute path name 251 which agrees with the value of the variable D exists in the shared directory absolute path name list 250 (step 427). If such a shared directory absolute path name 251 does not exist (No at the step 427), then the shared directory decision unit 123 proceeds to step 431. If such a shared directory absolute path name 251 exists (Yes at the step 427), then the shared directory decision unit 123 checks whether the variable I is false and the executable file name in the variable P is equal to the process name in the variable P (step 428). The executable file name is the executive file absolute path name in the variable P with a directory name removed. The process name is a first character string obtained by partitioning the command line character string in the variable P by blanks. If the conditions in the step 428 are satisfied (Yes at the step 428), then the shared directory decision unit 123 substitutes the process name in the variable P for the variable A (step 429) and then proceeds to the step 408 shown in FIG. 12. If the conditions in the step 428 are not satisfied (No at the step 428), then the shared directory decision unit 123 stores a character string (D+E) obtained by concatenating the character string of the value of the variable D and the character string of the value of the variable E into the variable A (step 430), and proceeds to the step 408 shown in FIG. 12. By the way, it is also possible to omit the processing conducted by the shared directory decision unit 123 (steps 427 to 430) and proceed from the step 426 to the step 431.

Subsequently, the subdirectory decision unit 124 checks whether a subdirectory name located at an end of the directory absolute path name indicated by the variable D agrees with any of the executable directory relative path names 261 in the executable directory relative path name list 260, i.e., whether an executable directory relative path name 261 which agrees with the subdirectory name exists (step 431). For example, when the executable directory relative path name 261 is only one in number and "bin", the agreement is judged to be attained if the value of the variable D is "/opt/someapp/bin/" whereas the agreement is judged to be not attained if the value of the variable D is "/opt/someapp/sbin/". If there is an executable directory relative path name which agrees (Yes at the step 431), then the subdirectory decision unit 124 removes the executable directory relative path name which agrees from the end of the variable D (step 432). After the removal, the subdirectory decision unit 124 proceeds to step 433. On the other hand, unless there is an executable directory relative path name which agrees (No at the step 431), then the subdirectory decision unit 124 proceeds directly to step 433.

Subsequently, the subdirectory decision unit 124 acquires a row in which the absolute path name 281 becomes a directory name from among rows in the recognized application name list 280 (step 433). If there is a row to be acquired (repeat at the step 433), then the subdirectory decision unit 124 stores the acquired row into the variable C and proceeds to step 434. If there are no longer rows to be acquire and processing for respective rows is finished ("after repeat" at the step 433), then the subdirectory decision unit 124 proceeds to the step 408 shown in FIG. 12.

Subsequently, the subdirectory decision unit 124 checks whether the absolute path name indicated by the variable C becomes the subdirectory name of the directory name indicated by the variable D (step 434). If so (Yes at the step 434), the subdirectory decision unit 124 replaces the absolute path name 281 with the value of the variable D, in a row associated with the variable C in the recognized application list 280, and proceeds to the step 408 shown in FIG. 12 (step 435). If not so (No at the step 434), the subdirectory decision unit 124 proceeds to step 436.

Subsequently, the subdirectory decision unit 124 checks whether the directory name indicated by the variable D is the same as the absolute path name indicated by the variable C, or becomes the subdirectory name of the directory name indicated by the variable C (step 436). If so (Yes at the step 436), then the subdirectory decision unit 124 stores the value of the variable C into the variable D and stores the application name 283 in the variable C into the variable A (step 437). After the storing, the subdirectory decision unit 124 proceeds to the step 408 shown in FIG. 12. On the other hand, if not so (No at the step 436), the subdirectory decision unit 124 returns to the step 433.

By the way, it is also possible to omit the processing conducted by the subdirectory decision unit 124 (steps 431 to 437) and proceed from the step 427 to the step 408 shown in FIG. 12. Furthermore, it is also possible to omit a part of the processing conducted by the subdirectory decision unit 124 (steps 433 to 437) and proceed from the step 431 or 432 to the step 408 shown in FIG. 12.

Figure 14:
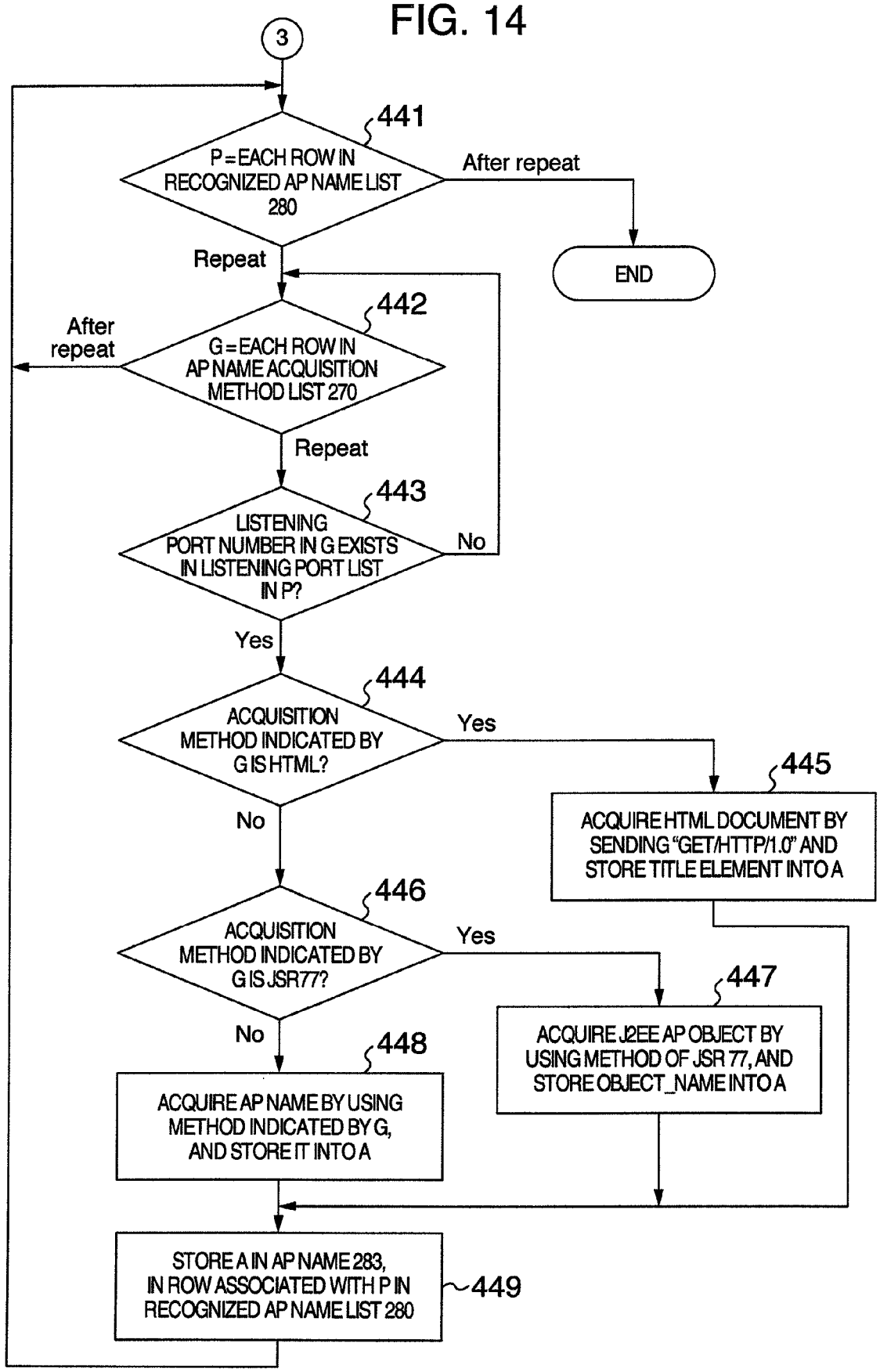
FIG. 14 is a flow diagram showing an application name recognition method, continued from FIG. 12.

FIG. 14 is a flow diagram showing processing (steps 441 to 449) conducted by the special application name recognition unit 126 in the first embodiment of the present invention.

First, the special application name recognition unit 126 acquires each row in the recognized application name list 280 (step 441). If there is a row to be acquired ("repeat" at the step 441), then the special application name recognition unit 126 stores contents of the row into the variable P and proceeds to step 442. If there are no longer rows to be acquired and the processing on respective rows is completed ("after repeat" at the step 441), then the special application name recognition unit 126 terminates the processing.

Subsequently, the special application name recognition unit 126 acquires each row in the application name acquisition method list 270 (step 442). If there is a row to be acquired ("repeat" at the step 442), then the special application name recognition unit 126 stores contents of the row into a variable G and proceeds to step 443. If there are no longer rows to be acquired and the processing on respective rows is finished ("after repeat" at the step 442), then the special application name recognition unit 126 returns to the step 441.

Subsequently, the special application name recognition unit 126 checks whether the listening port number (271; see FIG. 9) in the variable G exists in the listening port list (215; see FIG. 3) in the variable P (step 443). In other words, the special application name recognition unit 126 makes a decision whether the value stored in the listening port number 271 coincides with the value stored in the listening port list 215. If the listening port number exists (Yes at the step 443), the special application name recognition unit 126 proceeds to step 444. If the listening port number does not exist (No at the step 443), the special application name recognition unit 126 returns to step 442.

Subsequently, the special application name recognition unit 126 checks whether the acquisition method indicated by the variable G (273; see FIG. 9) is HTML (step 444). If the acquisition method is HTML (Yes at the step 444), then the special application name recognition unit 126 acquires an HTML document by using a port indicated by the variable G (a value in the listening port number 271) and a protocol (a value in the protocol to be used 272) for the business server 102. In the first embodiment of the present invention, the special application name recognition unit 126 acquires an HTML document located after / by sending a request "GET/ HTTP/1.0", stores contents of a TITLE element contained in the HTML document into the variable A, and proceeds to step 449 (step 445). Besides this, the special application name recognition unit 126 may acquire an HTML document from /index.php, /index.jsp, /index.do, /index.cgi or the like. On the other hand, if the acquisition method is not HTML (No at the step 444), then the special application name recognition unit 126 proceeds to step 446.

Subsequently, the special application name recognition unit 126 checks whether the acquisition method indicated by the variable G is JSR77 (step 446). If the acquisition method is JSR77 (Yes at the step 446), then the special application name recognition unit 126 acquires a J2EE application name (Application Object: OBJECT_NAME) according to a method indicated in JSR77 by using a port indicated by the variable G (a value in the listening port number 271) and a protocol (a value in the protocol to be used 272) for the business server 102, stores the J2EE application name into the variable A, and proceeds to the step 449 (step 447). On the other hand, if the acquisition method is not JSR77 (No at the step 446), then the special application name recognition unit 126 proceeds to step 448.

If the acquisition method is other than HTML or JSR77, then the special application name recognition unit 126 acquires an application name by using a protocol according to the acquisition method and stores the application name into the variable A (step 448). And the special application name recognition unit 126 stores contents of the variable A in the application name 283, in a row associated with the variable P in the recognized application name list 280 (step 449), and returns to the step 441.

JSR77 is described in detail in http://www.jcp.org/en/jsr/detail?id=77. If the protocol to be used is iiop (Internet Inter-ORB Protocol), then the special application name recognition unit 126 communicates with an MEJB (Management EJB) component operating on the business server by using the iiop protocol, and acquires J2EE (Java 2 Enterprise Edition) Application Object, and the value of its OBJECT_NAME attribute becomes the application name.

If the protocol to be used is snmp (Simple Network Management Protocol), then the special application name recognition unit 126 communicates with an SNMP agent operating on the business server by using the SNMP protocol, and acquires information indicated by MIB (Management Information Base) in iso.org.dod.internet.private.enterprises.sun.jcp.j2ee.j2eeMIB.j2ee Objects.j2eeMoGroup.j2eeAppTable, and the value of J2EEAppMoName contained in the information becomes J2EE application name.

If the protocol to be used is http (HyperText Transfer Protocol) or https (HyperText Transfer Protocol Security), then the special application name recognition unit 126 communicates with CIMOM (Common Information Model Object Manager) operating on the business server by means of the XML-CIM protocol using http or https, and acquires J2EE_DeployedObject object, and a Name property value contained in the object becomes the application name. By the way, the XML-CIM protocol is described in detail in http://www.dmtf.org/standards/wbem/CIM-XML.

The first embodiment of the present invention makes it possible for the system managing person of the information processing system to know the name of the application operating on the business server 102 by watching the recognized application name list 280. In particular, owing to the processing in the interpreter decision unit 122, it becomes possible to recognize a name of an application using the interpreter processing system more accurately. Owing to the processing in the shared directory decision unit 123, it becomes possible to recognize a name of an application associated with an executable file placed directly under the shared directory more accurately. Owing to the processing in the subdirectory decision unit 124, it becomes possible to recognize a name of an application which installs executable files in a plurality of different directories as one application name instead of recognizing an independent application name every directory. In addition, owing to the processing in the special application recognition unit 126, it becomes possible to recognize an application name more accurately as compared with the case where an application name is recognized from a directory name.

Conventionally, in each vendor, a name of an application provided to customers by the vendor is recognized by using know-how peculiar to the application. However, the conventional art has a problem that the name thus recognized has no versatility and version up of the application complicates the maintenance work of the know-how. In the technique of regarding a directory name of an executable file as the application name as in the present invention, therefore, the maintenance work is simplified by using only versatile information such as information which can be acquired from the OS normally, know-how of every OS, and well-known information concerning the interpreter.

Second Embodiment

Hereafter, a second embodiment obtained by improving the first embodiment according to the present invention will be described.

In the second embodiment, the application name found in the first embodiment is handled as a display name of the business server delivered to the processing shown in FIG. 12 as an argument. If a plurality of application names are recognized, the display name of the business server is found by linking the application names by using blanks or the like.

In the same way, when the business server delivered to the processing in FIG. 12 by an argument is operating on a virtual environment, the application name may be handled as a virtual machine name (VM name) of the server instead of the display name of the server.

According to the second embodiment of the present invention, it becomes possible for the system managing person of the information processing system to know what application is operating on a business server at a glance by only watching the display name of the business server or by only watching the virtual machine name associated with the business server operating on the virtual environment.

Third Embodiment

Hereafter, a third embodiment obtained by improving the first embodiment according to the present invention will be described.

In the third embodiment, the application name found in the first embodiment is set as a host name of the business server delivered to the processing in FIG. 12 by using an argument. If a plurality of application names are recognized, then the host name of the server is found by simply linking them or linking them with "-" or "." Between. Since only prescribed characters are used in the host name, characters which cannot be used should be deleted or replaced with "-". Furthermore, since there is a maximum value in the length of the host name, a character string which exceeds the maximum value should be deleted. Characters which can be used in the host name and the maximum value of the length of the host name are described in detail in RFC952 or RFC1123.

In the same way, if the business server delivered to the processing in FIG. 12 by using an argument is operating on a virtual environment, a file name of a disk image associated with the virtual environment may be renamed to the found application name. Since there are characters which cannot be used and the maximum number of characters in the file name as well in the same way as in the host name, they should be coped with in the same way as the host name.

According to the third embodiment of the present invention, it becomes possible for the system managing person of the information processing system to know what application is operating on a business server at a glance by only watching the host name of the business server or by only watching the file name of the disk image associated with the business server operating on the virtual environment.

<Other>

Heretofore, embodiments of the present invention have been exemplified. However, the present invention is not restricted to them, but they can be changed suitably without departing from the spirit of the present invention.

For example, in the present embodiment, the application name is recognized (processing in the application name recognition unit 125 (steps 408 to 413) basically via a procedure represented as (A): processing in the standard process decision unit 121 (steps 403 and 404), (B): processing in the interpreter decision unit (steps 420 to 426), (C): processing in the shared directory decision unit (steps 427 to 430), and (D): processing in the subdirectory decision unit 124 (steps 431 to 437).

However, it is also possible to recognize the application name by changing this procedure to (A)→(C)→(B)→(D), (A)→(D)→(B)→(C), . . . . Although differences might occur in the name recognition performance at this time, an optimum procedure can be selected according to the property of an application which should be recognized in name.

Furthermore, it is also possible to recognize an application name by using at least one of (A) to (D) (more preferably, by using at least one of (B) to (D).

Besides, concrete configurations of the hardware, the software and the flow charts can be changed suitably without departing from the spirit of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, an absolute path name of an executable file of the process generated in the business server, and a process name of the process so as to associate them with each other;

shared directory absolute path name information containing at least an absolute path name of a shared directory under which a plurality of executable files exist;

executable directory relative path name information containing at least a relative path name of a directory under which an executable file exists;

recognized application program name information containing at least an already recognized name of the application program, and a first directory absolute path name which is an absolute path name of a directory under which the application program exists so as to associate them with each other; and a control unit for executing control to extract an absolute path name of an executable file associated with the business server identification information from the process information on the basis of business server identification information acquired from outside, when an end of the found absolute path name of the directory agrees with the relative path name of the directory contained in the executable directory relative path name information, remove the end from the found absolute path name of the directory and define the found absolute path name of the directory with the end removed as a second directory absolute path name, compare the extracted absolute path name of the executable file with the absolute path name of the shared directory contained in the shared directory absolute path name information to make a decision whether the executable file exists under the shared directory, and when the executable file exists under the shared directory as a result of the decision, recognize a name of an application program operating on the business server identified by the acquired business server identification information by using an executable file name of the executable file or a process name of the process, wherein the storage unit stores:

business server information containing at least business server identification information identifying the business server, an operating system used in the business server, and a version of the operating system so as to associate them with each other; and operating system standard process information containing at least an operating system used in the business server, a version of the operating system, and an absolute path name of an executable file of a standard process of the operating system so as to associate them with each other, and the control unit:

extracts an operating system used in the business system and a version of the operating system from the business server information on the basis of business server identification information acquired from outside, and extracts an absolute path name of an executable file of a standard process which agrees with the extracted operating system and version from the operating system standard process information;

makes a decision whether the absolute path name of the executable file extracted from the process information coincides with the absolute path name of the executable file of the standard process extracted from the operating system standard process information; and in case of coincidence in the decision, omits processing of recognizing the application program with respect to the process acquired from the business server.

2. A configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, an absolute path name of an executable file of the process generated in the business server, and a command line of the process so as to associate them with each other;

interpreter name information containing at least a process name in an interpreter processing system;

executable directory relative path name information containing at least a relative path name of a directory under which an executable file exists, and recognized application program name information containing at least an already recognized name of the application program, and a first directory absolute path name which is an absolute path name of a directory under which the application program exists so as to associate them with each other; and a control unit for executing control to
extract an absolute path name of an executable file associated with the business server identification information from the process information on the basis of business server identification information acquired from outside,
when an end of the found absolute path name of the directory agrees with the relative path name of the directory contained in the executable directory relative path name information, remove the end from the found absolute path name of the directory and define the found absolute path name of the directory with the end removed as a second directory absolute path name,
compare the extracted absolute path name of the executable file with the process name of the interpreter processing system contained in the interpreter name information to make a decision whether a process concerning the executable file is a process in the interpreter processing system, and
when the process concerning the executable file is a process in the interpreter processing system, recognize a name of an application program operating on the business server identified by the acquired business server identification information by using an absolute path name of a script file or an intermediate language file found from the command line and processed in the interpreter processing system,
the storage unit stores:
business server information containing at least business server identification information identifying the business server, an operating system used in the business server, and a version of the operating system so as to associate them with each other; and
operating system standard process information containing at least an operating system used in the business server, a version of the operating system, and an absolute path name of an executable file of a standard process of the operating system so as to associate them with each other, and
the control unit:
extracts an operating system used in the business system and a version of the operating system from the business server information on the basis of business server identification information acquired from outside, and extracts an absolute path name of an executable file of a standard process which agrees with the extracted operating system and version from the operating system standard process information;
makes a decision whether the absolute path name of the executable file extracted from the process information coincides with the absolute path name of the executable file of the standard process extracted from the operating system standard process information; and
in case of coincidence in the decision, omits processing of recognizing the application program with respect to the process acquired from the business server.

3. A configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:
a storage unit for storing
process information containing at least business server identification information identifying the business server, and an absolute path name of an executable file of the process generated in the business server so as to associate them with each other, and
executable directory relative path name information containing at least a relative path name of a directory under which an executable file exists, and
recognized application program name information containing at least an already recognized name of the application program, and a first directory absolute path name which is an absolute path name of a directory under which the application program exists so as to associate them with each other; and
a control unit for executing control to
extract an absolute path name of an executable file associated with the business server identification information from the process information on the basis of business server identification information acquired from outside, and find an absolute path name of a directory under which the executable file exists from the extracted absolute path name of the executable file,
when an end of the found absolute path name of the directory agrees with the relative path name of the directory contained in the executable directory relative path name information, remove the end from the found absolute path name of the directory and define the found absolute path name of the directory with the end removed as a second directory absolute path name,
compare the first directory absolute path name with the second directory absolute path name to make a decision whether a directory parent-child relation holds true between the first directory absolute path name and the second directory absolute path name, and
when a directory parent-child relation holds true as a result of the decision, recognize a name of an application program operating on the business server identified by the acquired business server identification information by using the first directory absolute path name or the second directory absolute path name which forms a parent directory in the parent-child relation,
the storage unit stores:
business server information containing at least business server identification information identifying the business server, an operating system used in the business server, and a version of the operating system so as to associate them with each other; and
operating system standard process information containing at least an operating system used in the business server, a version of the operating system, and an absolute path name of an executable file of a standard process of the operating system so as to associate them with each other, and
the control unit:
extracts an operating system used in the business system and a version of the operating system from the business server information on the basis of business server identification information acquired from outside, and extracts an absolute path name of an executable file of a standard process which agrees with the extracted operating system and version from the operating system standard process information;
makes a decision whether the absolute path name of the executable file extracted from the process information coincides with the absolute path name of the executable file of the standard process extracted from the operating system standard process information; and in case of coincidence in the decision, omits processing of recognizing the application program with respect to the process acquired from the business server.

4. A name recognition method in a configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, an absolute path name of an executable file of the process generated in the business server, and a process name of the process so as to associate them with each other, shared directory absolute path name information containing at least an absolute path name of a shared directory under which a plurality of executable files exist, executable directory relative path name information containing at least a relative path name of a directory under which an executable file exists, recognized application program name information containing at least an already recognized name of the application program, and a first directory absolute path name which is an absolute path name of a directory under which the application program exists so as to associate them with each other; and a control unit in the configuration management server executes the steps of:

extracting an absolute path name of an executable file associated with the business server identification information from the process information on the basis of business server identification information acquired from outside;

when an end of the found absolute path name of the directory agrees with the relative path name of the directory contained in the executable directory relative path name information, removing the end from the found absolute path name of the directory and define the found absolute path name of the directory with the end removed as a second directory absolute path name, comparing the extracted absolute path name of the executable file with the absolute path name of the shared directory contained in the shared directory absolute path name information to make a decision whether the executable file exists under the shared directory; and when the executable file exists under the shared directory as a result of the decision, recognizing a name of an application program operating on the business server identified by the acquired business server identification information by using an executable file name of the executable file or a process name of the process, the storage unit stores:

business server information containing at least business server identification information identifying the business server, an operating system used in the business server, and a version of the operating system so as to associate them with each other; and operating system standard process information containing at least an operating system used in the business server, a version of the operating system, and an absolute path name of an executable file of a standard process of the operating system so as to associate them with each other, and the control unit executes the steps of:

extracting an operating system used in the business system and a version of the operating system from the business server information on the basis of business server identification information acquired from outside, and extracting an absolute path name of an executable file of a standard process which agrees with the extracted operating system and version from the operating system standard process information; and making a decision whether the absolute path name of the executable file extracted from the process information coincides with the absolute path name of the executable file of the standard process extracted from the operating system standard process information, and in case of coincidence in the decision, processing of recognizing the application program is omitted with respect to the process acquired from the business server.

5. A name recognition method in a configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, an absolute path name of an executable file of the process generated in the business server, and a command line of the process so as to associate them with each other, interpreter name information containing at least a process name in an interpreter processing system, executable directory relative path name information containing at least a relative path name of a directory under which an executable file exists, and recognized application program name information containing at least an already recognized name of the application program, and a first directory absolute path name which is an absolute path name of a directory under which the application program exists so as to associate them with each other, and a control unit in the configuration management server executes the steps of:

extracting an absolute path name of an executable file associated with the business server identification information from the process information on the basis of business server identification information acquired from outside;

when an end of the found absolute path name of the directory agrees with the relative path name of the directory contained in the executable directory relative path name information, remove the end from the found absolute path name of the directory and define the found absolute path name of the directory with the end removed as a second directory absolute path name;

comparing the extracted absolute path name of the executable file with the process name of the interpreter processing system contained in the interpreter name information to make a decision whether a process concerning the executable file is a process in the interpreter processing system; and when the process concerning the executable file is a process in the interpreter processing system, recognizing a name of an application program operating on the business server identified by the acquired business server identification information by using an absolute path name of a script file or an intermediate language file found from the command line and processed in the interpreter processing system, the storage unit stores:

business server information containing at least business server identification information identifying the business server, an operating system used in the business server, and a version of the operating system so as to associate them with each other; and operating system standard process information containing at least an operating system used in the business server, a version of the operating system, and an absolute path name of an executable file of a standard process of the operating system so as to associate them with each other, and the control unit executes the steps of:

extracting an operating system used in the business system and a version of the operating system from the business server information on the basis of business server identification information acquired from outside, and extracting an absolute path name of an executable file of a standard process which agrees with the extracted operating system and version from the operating system standard process information; and making a decision whether the absolute path name of the executable file extracted from the process information coincides with the absolute path name of the executable file of the standard process extracted from the operating system standard process information, and in case of coincidence in the decision, processing of recognizing the application program is omitted with respect to the process acquired from the business server.

6. A name recognition method in a configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, and an absolute path name of an executable file of the process generated in the business server so as to associate them with each other, and executable directory relative path name information containing at least a relative path name of a directory under which an executable file exists, and recognized application program name information containing at least an already recognized name of the application program, and a first directory absolute path name which is an absolute path name of a directory under which the application program exists so as to associate them with each other, and a control unit in the configuration management server executes the steps of:

extracting an absolute path name of an executable file associated with the business server identification information from the process information on the basis of business server identification information acquired from outside, and finding an absolute path name of a directory under which the executable file exists from the extracted absolute path name of the executable file;

when an end of the found absolute path name of the directory agrees with the relative path name of the directory contained in the executable directory relative path name information, removing the end from the found absolute path name of the directory and defining the found absolute path name of the directory with the end removed as a second directory absolute path name;

comparing the first directory absolute path name with the second directory absolute path name to make a decision whether a directory parent-child relation holds true between the first directory absolute path name and the second directory absolute path name; and when a directory parent-child relation holds true as a result of the decision, recognizing a name of an application program operating on the business server identified by the acquired business server identification information by using the first directory absolute path name or the second directory absolute path name which forms a parent directory in the parent-child relation, the storage unit stores:

business server information containing at least business server identification information identifying the business server, an operating system used in the business server, and a version of the operating system so as to associate them with each other; and operating system standard process information containing at least an operating system used in the business server, a version of the operating system, and an absolute path name of an executable file of a standard process of the operating system so as to associate them with each other, and the control unit executes the steps of:

extracting an operating system used in the business system and a version of the operating system from the business server information on the basis of business server identification information acquired from outside, and extracting an absolute path name of an executable file of a standard process which agrees with the extracted operating system and version from the operating system standard process information; and making a decision whether the absolute path name of the executable file extracted from the process information coincides with the absolute path name of the executable file of the standard process extracted from the operating system standard process information, and in case of coincidence in the decision, processing of recognizing the application program is omitted with respect to the process acquired from the business server.

7. A name recognition program which causes a computer included in a configuration management server to execute a name recognition method in the configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, an absolute path name of an executable file of the process generated in the business server, and a process name of the process so as to associate them with each other;

shared directory absolute path name information containing at least an absolute path name of a shared directory under which a plurality of executable files exist;

executable directory relative path name information containing at least a relative path name of a directory under which an executable file exists, recognized application program name information containing at least an already recognized name of the application program, and a first directory absolute path name which is an absolute path name of a directory under which the application program exists so as to associate them with each other; and the name recognition program causes a control unit in the configuration management server to execute:

processing of extracting an absolute path name of an executable file associated with the business server identification information from the process information on the basis of business server identification information acquired from outside;

when an end of the found absolute path name of the directory agrees with the relative path name of the directory contained in the executable directory relative path name information, processing of removing the end from the found absolute path name of the directory and define the found absolute path name of the directory with the end removed as a second directory absolute path name processing of comparing the extracted absolute path name of the executable file with the absolute path name of the shared directory contained in the shared directory absolute path name information to make a decision whether the executable file exists under the shared directory; and when the executable file exists under the shared directory as a result of the decision, processing of recognizing a name of an application program operating on the business server identified by the acquired business server identification information by using an executable file name of the executable file or a process name of the process, the storage unit stores:

business server information containing at least business server identification information identifying the business server, an operating system used in the business server, and a version of the operating system so as to associate them with each other; and operating system standard process information containing at least an operating system used in the business server, a version of the operating system, and an absolute path name of an executable file of a standard process of the operating system so as to associate them with each other, and the name recognition program causes the control unit to execute:

processing of extracting an operating system used in the business system and a version of the operating system from the business server information on the basis of business server identification information acquired from outside, and extracting an absolute path name of an executable file of a standard process which agrees with the extracted operating system and version from the operating system standard process information; and processing of making a decision whether the absolute path name of the executable file extracted from the process information coincides with the absolute path name of the executable file of the standard process extracted from the operating system standard process information, and in case of coincidence in the decision, the name recognition program causes processing of recognizing the application program to be omitted with respect to the process acquired from the business server.

8. A name recognition program which causes a computer included in a configuration management server to execute a name recognition method in the configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, an absolute path name of an executable file of the process generated in the business server, and a command line of the process so as to associate them with each other;

interpreter name information containing at least a process name in an interpreter processing system;

executable directory relative path name information containing at least a relative path name of a directory under which an executable file exists, and recognized application program name information containing at least an already recognized name of the application program, and a first directory absolute path name which is an absolute path name of a directory under which the application program exists so as to associate them with each other; and the name recognition program causes a control unit in the configuration management server to execute:

processing of extracting an absolute path name of an executable file associated with the business server identification information from the process information on the basis of business server identification information acquired from outside;

when an end of the found absolute path name of the directory agrees with the relative path name of the directory contained in the executable directory relative path name information, processing of removing the end from the found absolute path name of the directory and define the found absolute path name of the directory with the end removed as a second directory absolute path name;

processing of comparing the extracted absolute path name of the executable file with the process name of the interpreter processing system contained in the interpreter name information to make a decision whether a process concerning the executable file is a process in the interpreter processing system; and when the process concerning the executable file is a process in the interpreter processing system, processing of recognizing a name of an application program operating on the business server identified by the acquired business server identification information by using an absolute path name of a script file or an intermediate language file found from the command line and processed in the interpreter processing system, the storage unit stores:

business server information containing at least business server identification information identifying the business server, an operating system used in the business server, and a version of the operating system so as to associate them with each other; and operating system standard process information containing at least an operating system used in the business server, a version of the operating system, and an absolute path name of an executable file of a standard process of the operating system so as to associate them with each other, and the name recognition program causes the control unit to execute:

processing of extracting an operating system used in the business system and a version of the operating system from the business server information on the basis of business server identification information acquired from outside, and extracting an absolute path name of an executable file of a standard process which agrees with the extracted operating system and version from the operating system standard process information; and processing of making a decision whether the absolute path name of the executable file extracted from the process information coincides with the absolute path name of the executable file of the standard process extracted from the operating system standard process information, and in case of coincidence in the decision, the name recognition program causes processing of recognizing the application program to be omitted with respect to the process acquired from the business server.

9. A name recognition program which causes a computer included in a configuration management server to execute a name recognition method in the configuration management server connected to a business server so as to be able to communicate with the business server, the business server storing and managing a process generated by operating an application program which implements service provided to business clients, the configuration management server recognizing a name of the application program on the basis of the process acquired from the business server, the configuration management server comprising:

a storage unit for storing process information containing at least business server identification information identifying the business server, and an absolute path name of an executable file of the process generated in the business server so as to associate them with each other, and executable directory relative path name information containing at least a relative path name of a directory under which an executable file exists, and recognized application program name information containing at least an already recognized name of the application program, and a first directory absolute path name which is an absolute path name of a directory under which the application program exists so as to associate them with each other, and the name recognition program causes a control unit in the configuration management server to execute:

processing of extracting an absolute path name of an executable file associated with the business server identification information from the process information on the basis of business server identification information acquired from outside, and finding an absolute path name of a directory under which the executable file exists from the extracted absolute path name of the executable file;

when an end of the found absolute path name of the directory agrees with the relative path name of the directory contained in the executable directory relative path name information, processing of removing the end from the found absolute path name of the directory and defining the found absolute path name of the directory with the end removed as a second directory absolute path name;

processing of comparing the first directory absolute path name with the second directory absolute path name to make a decision whether a directory parent-child relation holds true between the first directory absolute path name and the second directory absolute path name; and when a directory parent-child relation holds true as a result of the decision, processing of recognizing a name of an application program operating on the business server identified by the acquired business server identification information by using the first directory absolute path name or the second directory absolute path name which forms a parent directory in the parent-child relation, the storage unit stores:

business server information containing at least business server identification information identifying the business server, an operating system used in the business server, and a version of the operating system so as to associate them with each other; and operating system standard process information containing at least an operating system used in the business server, a version of the operating system, and an absolute path name of an executable file of a standard process of the operating system so as to associate them with each other, and the name recognition program causes the control unit to execute:

processing of extracting an operating system used in the business system and a version of the operating system from the business server information on the basis of business server identification information acquired from outside, and extracting an absolute path name of an executable file of a standard process which agrees with the extracted operating system and version from the operating system standard process information; and processing of making a decision whether the absolute path name of the executable file extracted from the process information coincides with the absolute path name of the executable file of the standard process extracted from the operating system standard process information, and in case of coincidence in the decision, the name recognition program causes processing of recognizing the application program to be omitted with respect to the process acquired from the business server.

* * * * *